US006362271B1

(12) United States Patent
Lin et al.

(10) Patent No.: US 6,362,271 B1
(45) Date of Patent: Mar. 26, 2002

(54) POLYVINYLIDENE FLUORIDE WEATHER RESISTANT COATING COMPOSITIONS INCLUDING POLYMETHYL METHACRYLATE

(75) Inventors: Shiow-Ching Lin, Lawrenceville; Craig Kamsler, North Brunswick; Karol Argasinski, Sicklerville, all of NJ (US)

(73) Assignee: Ausimont USA, Inc., Thorofare, NJ (US)

( * ) Notice: Subject to any disclaimer, the term of this patent is extended or adjusted under 35 U.S.C. 154(b) by 0 days.

(21) Appl. No.: 09/384,123

(22) Filed: Aug. 27, 1999

Related U.S. Application Data

(63) Continuation-in-part of application No. 09/036,256, filed on Mar. 5, 1998, now Pat. No. 5,981,854.
(51) Int. Cl.[7] .............................................. C08L 27/00
(52) U.S. Cl. ........................ 524/520; 523/346; 523/351
(58) Field of Search .......................... 524/520; 523/346, 523/351

(56) References Cited

U.S. PATENT DOCUMENTS

| | | | |
|---|---|---|---|
| 3,324,069 A | 6/1967 | Koblitz et al. ............. | 260/31.4 |
| 3,607,754 A | 9/1971 | Asahina ..................... | 252/63.2 |
| 4,770,939 A | 9/1988 | Sietsess et al. ............. | 428/402 |
| 4,822,122 A | 4/1989 | Yamamoto et al. ...... | 350/96.31 |
| 4,902,557 A | * 2/1990 | Rohrbacher ................. | 428/215 |
| 5,030,394 A | 7/1991 | Sietses et al. ................. | 264/28 |
| 5,082,616 A | 1/1992 | White et al. ................ | 264/567 |

* cited by examiner

Primary Examiner—Edward J. Cain
(74) Attorney, Agent, or Firm—Norris McLaughlin & Marcus

(57) ABSTRACT

A weather resistant coating composition comprising a miscible polymer blend of highly crystalline polyvinylidene fluoride polymer and polyalkyl methacrylate, such as PVDF and PMMA. The miscible blend comprises from about 50 weight percent to about 90 weight percent polymer comprising polyvinylidene fluoride and from about 10 weight percent to about 50 weight percent polyalkyl methacrylate. The polyalkyl methacrylate having a molecular weight within the range of about 25,000 grams per mole to about 200,000 grams per mole. The crystallinity of the polyvinylidene fluoride polymer is about 20% to about 70%. The weather resistant coating has excellent and unexpected physical characteristics, including solvent resistance and gloss retention.

18 Claims, 2 Drawing Sheets

POLYVINYLIDENE FLUORIDE WEATHER RESISTANT COATING COMPOSITIONS INCLUDING POLYMETHYL METHACRYLATE

CROSS-REFERENCE TO RELATED APPLICATIONS

This is a Continuation-in-Part of application Ser. No. 09/036,256 filed on Mar. 5, 1998 now U.S. Pat No. 5,981,854.

BACKGROUND OF INVENTION

The invention relates to miscible polymer blends comprising polyvinylidene fluoride ("PVDF") and its copolymers, and polyalkyl methacrylates having a molecular weight from about 25,000 grams per mole to about 200,000 grams per mole, including polymethyl methacrylate ("PMMA"). The terms polyvinylidene fluoride and polyalkyl methacrylate as used herein are meant to encompass polymers comprising these materials, including homopolymers of these materials and copolymers comprising these materials. Miscible polymer blends can be generally described as polymer blends that are homogeneous down to the molecular level associated with a negative value of the free energy of mixing. The invention provides miscible polymer blends with superior and unexpected physical characteristics, including solvent resistance, gloss retention and adhesion after weathering.

Polyvinylidene fluoride, in particular, PVDF is a very important raw material for architectural coatings based largely on ultraviolet ("UV") light transparency. PVDF, for example, provides long term protection for metal surfaces against exterior exposure, much better than other known coating materials. In order to balance the performance of polyvinylidene fluoride coatings, such as PVDF coatings, a secondary resin normally is needed to provide good adhesion to substrate, to reduce the shrinkage of the polyvinylidene fluoride due to excess crystallization, to increase the dispersability of a pigment in a coating and to obtain good optical properties. The selection of the secondary resin is based largely on the miscibility of the resin with polyvinylidene fluoride polymers.

Blending polymers has been an important industrial approach towards development of polymeric coating materials, however much of the development work has been based on compatibility of polymers. PVDF is compatible with a few industrial polymers, including polymers of alkyl methacrylate and alkyl acrylates with carbon content on alkyl groups of less than 3. The polymers miscible with PVDF, as well as other polymers comprising polyvinylidene fluoride, have the common characteristic of high concentrations of C=O groups, particularly on side chains of the carbon polymer.

PVDF is thermodynamically miscible with polymers of alkyl methacrylate and it is discovered by the inventors that PVDF is thermodynamically miscible with polymethyl methacrylate having a molecular weight of from about 25,000 grams per mole to about 250,000 grams per mole which, as a miscible polymer blend, unexpectedly results in a blend having superior physical characteristics favorable for weather resistant coating materials.

U.S. Pat. Nos. 4,770,939 and 5,030,394 to Sietses et al. ("Sietses") describe a process for preparing blends comprising PVDF having molecular weight of between about 10,000 and 70,000 with thermoplastic PMMA. According to Sietses, coating materials made with the process of that invention with PVDF having molecular weights above 70,000 are said to be unacceptable because the coating material remains too viscous when treated with heat during application on a substrate. The blends in Sietses are cryogenically ground to a powder and require the use of a flow promoter. Powder coating requires a low melt viscosity. Therefore, high molecular weight polymers are not suitable for such application. This is different from dispersion coating such as that of the invention, which allows the use of polymers having from low to high molecular weight. The Sietses patent concerns the use of low molecular weight polymers for processibility rather than the optimization of coating performance.

For comparison, Sietses prepared a dispersion coating comprising PVDF with a molecular weight of about 350,000 and viscosity of about 31,000 poise and an unspecified thermoplastic methyl methacrylate polymer. Because of the lack of optimization it has only 85% gloss retention after 2,000 hours. The current invention exhibited the optimized polymethyl methacrylate structure, that is a molecular weight of between about 25,000 grams per mole and about 200,000 grams per mole to provide 100% of gloss retention after 5,000 hours of QUV exposure as illustrated in FIG. 2.

U.S. Pat. No. 3,324,069 to Koblitz et al. discusses dispersions of PVDF and acrylate polymer. The disclosure of this patent does not address miscibility of the polymer and characterizes the compositions as alloys. This patent indicates that addition of more than 25% acrylate polymer is unfavorable as it causes a significant reduction in the properties of the PVDF.

U.S. Pat. No. 5,082,616 to White ("White") describes a method for preparing biaxially oriented PVDF/PMMA films comprising blends of PVDF with a molecular weight of about 330,000 to about 390,000 and PMMA with a molecular weight of about 110,000 to about 125,000. The amount PMMA in the film, or other polymers, is from about 10% to about 30% of the film, and it is said in White that addition of more than about 30% other polymer detrimentally affects the physical properties of the film. The biaxially oriented film is made by a double bubble process.

The properties and characteristics of PVDF and PMMA blends can be fashioned to achieve purposes of a particular application. In White, for example, PVDF/PMMA blends are formulated to obtain films and not coating compositions. An aspect of the invention in White is retarding the crystallization of PVDF during the double bubble processing method used to obtain the film.

Thus, the film obtained by the method in White comprises PVDF with a lower crystallinity than the PVDF in blends of the invention. With respect to the coating compositions of the invention described herein, it is desired to maintain the crystalline structure of the vinylidene fluoride as this results, in part, in the unexpected properties of the weather resistance and solvent resistance of the coating compositions. The coating composition maintains crystallinity of the vinylidene fluoride polymer by employing a solvent preparation method. The polymers are blended in a latent solvent and then a pigment is added. The solvated blend is then heated to remove the solvent thus forming the coating composition. The coating composition of the invention has highly crystalline polyvinylidene fluoride and the retardation of crystallization of the polymer during coating formation.

The invention described herein is a coating used on substrates. White describes PVDF films capable of exhibiting desirable piezoelectric properties and, thus, White does not describe weather coating compositions, and characteristics such as gloss retention and solvent resistance are not important or characteristics of the piezoelectric films of White. It is not uncommon for polymers with similar content to be different and exhibit different characteristics based on internal or molecular structural differences. White, for example, concerns a biaxially oriented film with PVDF having retarded crystallinization as contrasted with the coating preparation of the invention. The invention exhibits superior qualities such as gloss retention and solvent resistance after QUV exposure. This is achieved, in part, by the crystalline structure of the polyvinylidene fluoride, such as PVDF, which remains significantly unaffected during blending of the vinylidene fluoride polymer with other polymers.

U.S. Pat. No. 3,607,754 to Asahina concerns the use of PVDF/PMMA blends for their piezoelectric properties and concerns blends with very high molecular weight PMMA, that is about 1,000,000 grams per mole, for use as electrets. U.S. Pat. No. 4,822,122 to Yamamato concerns PVDF/PMMA blends used as optical transmission media. These patents provide further examples of the use of vinylidene fluoride polymer and polyalkyl methacrylate blends formulated to achieve desired properties and characteristics for particular applications.

The present invention utilizes miscible blends comprising polyalkyl methacrylates such as PMMA, within a certain molecular weight range and vinylidene fluoride polymers, such as PVDF for coatings which, surprisingly, affects the physical characteristics of the coating, including solvent resistance and gloss retention. Since polyvinylidene fluoride particles undergo plasticization and mixing with solvent and polyalkyl methacrylate, respectively, the development of physical properties during the formation of the blend is a kinetic process. Initially, the solvent swells and solvates vinylidene fluoride polymer particles, and eventually the solvated vinylidene fluoride polymer is mixed with the polyalkyl methacrylate. It has been found that the uniformity of the mixing depends on the molecular weight of the polyalkyl methacrylate.

It is discovered that a miscible blend of polymers comprising polyvinylidene fluoride and polymers comprising polyalkyl methacrylates within a certain molecular weight range results in a coating composition with superior physical properties including hardness, gloss retention and solvent resistance. The polymers comprising polyvinylidene fluoride may be a homopolymer of vinylidene fluoride, that is PVDF, or a copolymer of more than about 80% vinylidene fluoride and up to about 20% hexafluoropropylene. The polyalkyl methacrylate may be the homopolymer of methyl methacrylate, that is PMMA, but can also be a copolymer comprising at least 65% methyl methacrylate and up to 35% other alkyl methacrylates such as ethyl methacrylate and butyl methacrylate. When the molecular weight of the alkyl methacrylate, such a PMMA, is between about 25,000 grams per mole and about 200,000 grams per mole, solvated highly crystalline PVDF, or highly crystalline copolymers comprising highly crystalline polyvinylidene fluoride, will mix uniformly without significantly retarding crystallization thus resulting in a coating composition with better hardness, solvent resistance and gloss retention then other known PVDF coatings. The high crystallinity of the vinylidene fluoride polymer and the uniform mixing achieved by use of polyalkyl methacrylate with a molecular weight from about 25,000 grams per mole to about 200,000 grams per mole provide the coating compositions with these favorable properties. Highly crystalline polymers comprising vinylidene fluoride, are a hompolymer of vinylidene fluoride or a copolymer of more than about 80% vinylidene fluoride and up to about 20% hexafluoropropylene with a crystallinity of from about 20% to about 70%.

All percentages and ratios set forth herein are by weight/weight unless specifically designated otherwise.

SUMMARY OF THE INVENTION

The present invention is a weather resistant coating composition comprising a polymer comprising vinylidene fluoride having a molecular weight of up to about 600,000 grams per mole and polyalkyl methacrylates having a molecular weight between about 25,000 grams per mole and about 200,000 grams per mole, preferably about 100,000 grams per mole to about 150,000 grams per mole, which coating compositions have unexpected combined superior properties, including gloss retention, adhesion and solvent resistance. More specifically, the vinylidene fluoride polymer is either a homopolymer of vinylidene fluoride or a copolymer of more than about 80% vinylidene fluoride and up to about 20% hexafluoropropylene and the polyalkyl methacrylate is polymethyl methacrylate or copolymers of more than about 65% methyl methacrylate and up to about 35% ethyl methacrylate or butyl methacrylate. The weather resistant coating compositions comprise from about 50% to about 90% polymer comprising vinylidene fluoride and from about 10% to about 50% polyalkyl methacrylate.

The weather coating composition is made by solvation process. Alkyl methacrylate polymer, such as PMMA, is dissolved in a latent solvent and then the polymer comprising vinylidene fluoride, such as PVDF, is mixed with the PMMA solution. Pigments and other fillers or additives may also be added to the mixture. The mixture is heated so that the solvent evaporates resulting in the coating composition. It is discovered that mixing of the polymers in this manner allows the polyvinylidene fluoride to form a highly crystalline blend after baking, thus resulting in a weather coating composition with highly crystalline polyvinylidene fluoride, such that the polyvinylidene fluoride, or polymer comprising polyvinylidene fluoride, has a crystallinity of about 20% to about 70%. The highly crystalline structure and the mixing that occurs when polyalkyl methacrylate having the particular molecular weight range is used results in a coating composition with unexpectedly superior properties, including hardness, adhesion and solvent resistance, in addition to gloss retention.

One of the purposes of the invention is obtaining a weather resistant coating composition with superior physical properties. Compositions in accordance with the invention exhibited greater solvent resistance and gloss retention. The coating compositions, for example, had about 100 percent gloss retention after 5,000 hours of QUV exposure. Whereas, coating compositions formulated with PVDF and a commercially available acrylic resin, had about 70% gloss retention after 5,000 hours. The excellent and unexpected gloss retention can be attributed, in part, to the molecular weight of the alkyl methacrylate being between about 25,000 grams per mole and about 200,000 grams per mole which results in more uniform mixing during the solvation process and a stronger composition.

DETAILED DESCRIPTION OF THE PREFERRED EMODIMENT

Figure 1:
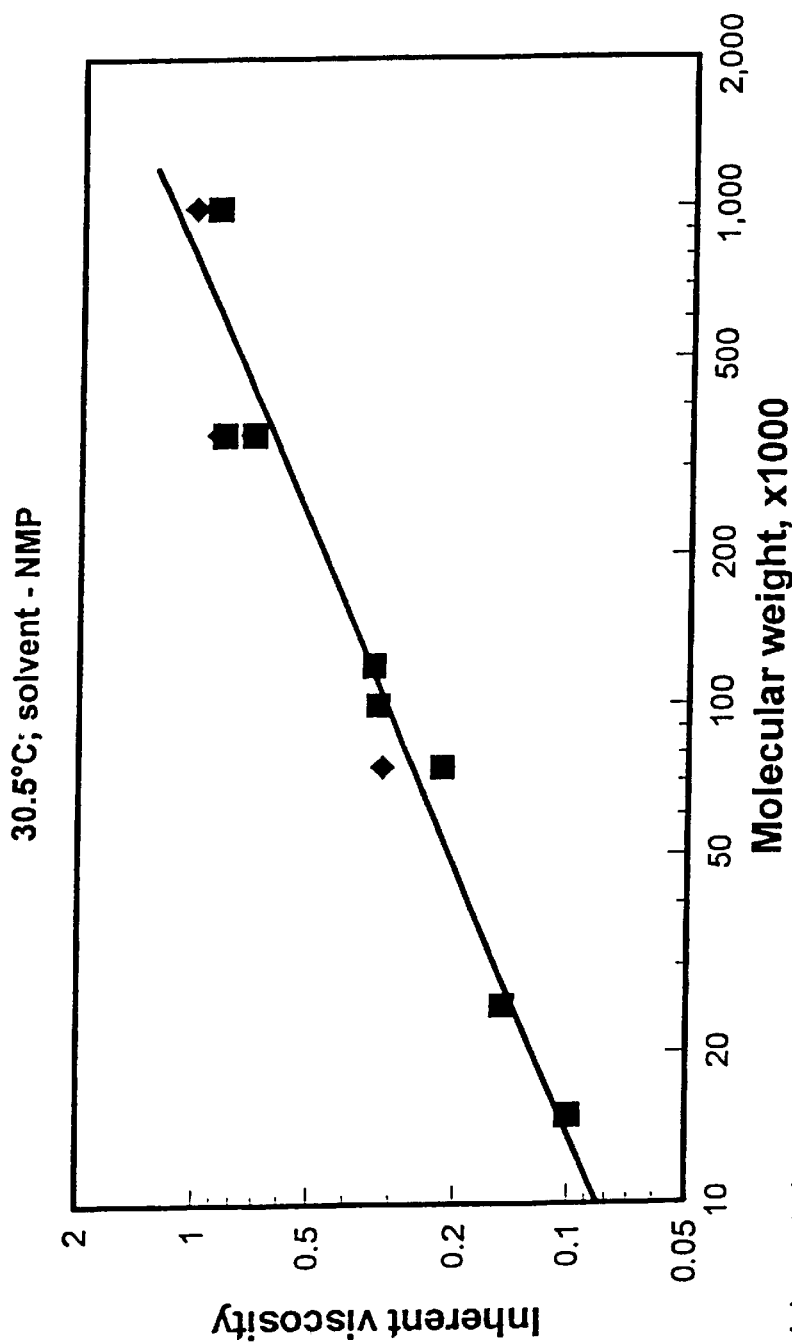
FIG. 1 is a plot of Inherent Viscosity as a function of Molecular Weight for PMMA.

In the following description, the invention is described in terms of a preferred embodiment, but such description should not limit the scope of the invention, which is set forth in the accompanying claims.

PVDF is compatible and/or miscible with a wide range of polymers such as polymethacrylates, polyacrylates and polyvinyl acetates containing C=O groups in the ester, amide or ketone forms. The compatibility and/or miscibility, in part, arises from the interaction between the C=O bonds of the polymethacrylates, polyacrylates and polyvinyl acetates, as the case may be, and the $CH_2$ groups of the vinylidene fluoride. PVDF is particularly useful for the weather resistant coating compositions because the photo-oxidative resistance and the high crystallinity of the PVDF provides strength to the composition and the salvation process employed with the invention provides a coating composition wherein the PVDF in the blend has high crystallinity, that is from about 20% to about 70%. PVDF with a melt viscosity of about 1 kpoise to about 80 kpoise at 232° and a shear rate of about 100 $sec^{-1}$ can be used to obtain a PVDF containing composition capable of use as a coating material of the invention. In this embodiment, as well as other embodiments of the invention, no flow promoter is necessary for the coating composition.

PMMA can be used as secondary polymer for PVDF coating applications. PMMA has excellent miscibility with PVDF and provides good heat resistance, mechanical properties, weatherability and optical clarity. It has been discovered that blending PVDF and PMMA with a molecular weight between about 25,000 grams per mole and about 200,000 grams per mole; preferably between about 100,000 grams per mole and about 150,000 grams per mole; obtains a miscible blend and provides for better interaction between the PVDF and PMMA and more thorough blending thus, combined with the desirable properties related to the highly crystalline structure of the PVDF, provides a coating composition with unexpected weather resistance. That is the coating compositions have, in addition to other properties, superior and unexpected hardness, adhesion, gloss retention and solvent resistance.

In accordance with one aspect of the present invention, it has been found that miscible blends comprising from about 50% by weight to about 90% by weight PVDF and about 10% by weight to about 50% by weight PMMA, having the molecular weight range of the invention, result in a coating composition with excellent and unexpected properties. The present invention, however, is illustrated in the Examples below through use of a PVDF/PMMA miscible blend with 70% PVDF and 30% PMMA.

Accordingly, miscible blends of PVDF and PMMA with a low molecular weight of about 15,000 grams per mole, a moderate molecular weight of about 120,000 grams per mole and a very high molecular weight of about 1,000,000 grams per mole were prepared and tested for solvent resistance, pencil hardness, gloss retention, reverse impact, adhesion and accelerated weathering. A blend comprising PVDF and Acryloid B-44 resin known as Paraloid B-44, currently available from Rohm & Hass of Philadelphia, Pa., USA was also prepared for comparison purposes. The PVDF used in the Examples had a molecular weight of about 350,000 grams per mole, a melt viscosity of about 31 k poise at 232° C. and a shear rate of about 100 $sec^{-1}$.

PMMA used in the Examples was characterized by inherent viscosity in N-methylpyrrolidone at 30.5° C., in order to properly evaluate the molecular weight effect of PMMA on the performance of PVDF based weather resistant coatings. The inherent viscosity is defined by the following equation:

$$\eta_{inh}=\ln(t/t\circ)/C$$

where C is the concentration of PMMA in grams per mole, t and to are flow times of solution and solvent, respectively, in a capillary viscometer. The relationship between the inherent viscosity of PMMA and molecular weight determined by experiment are set forth in FIG. 1, and may be expressed by the following equation:

$$\log\eta_{inh}=\log K+a(\log MW)$$

where K and a are equal to 0.022 and 0.57, respectively.

EXAMPLE 1

PMMA solution with a low weight average molecular weight of about 15,000 grams per mole was blended in a pigment to form a uniform dispersion and was then homogenized by a sand mill. Two different pigments were used, Titanium Dioxide and Shepard Blue #3. The PMMA pigment dispersions were added to an amount of PVDF appropriate to formulate a blend containing, by weight, 70 parts PVDF to 30 parts PMMA. The blend was then further homogenized by a high speed disperser for about 15 minutes and then by glass bead shaker for about 15 hours to develop the final coating composition. The composition of the coatings with PMMA with a molecular weight of 15,000 grams per mole prepared for this study are described in Table 1 under Experiment Numbers 2 and 6.

The coatings were applied to aluminum substrates and baked to a peak metal temperature of 465° F. for about one minute. The dry coating on the substrate was tested for solvent resistance by MEK (methy ethyl ketone) double rubs in accordance with ASTM standard 5402-93, pencil hardness in accordance with ASTM standard D3363-92a, gloss in accordance with ASTM standard D523-89, reverse impact in accordance with ASTM standard 2794-93, adhesion in accordance with ASTM standard D3359-93 and OT (Zero T) flexibility in accordance with ASTM standard 3281-84. ASTM standards 5402-93, D3363-92a, D523-89, 2794-93, D3359-93 and 3281-84 are incorporated herein by reference. The results are described in Table 2 under Experiment Numbers 2 and 6.

The coating compositions prepared with PMMA with a low molecular weight of 15,000 grams per mole were subjected to accelerated QUV weathering tests using UVB-313 lamps and applying standard test methods set forth in ASTM standards D4329-84, D4587-91 and G53-95 which are incorporated herein by reference. The coating was exposed, at intervals, to 8 hours of UV light at 70° C., and 4 hours of condensation at 50° C. The testing interval was every 500 hours for a total testing time of 5,000 hours. The weatherability testing results represented in percentage gloss retention for the coating prepared with PMMA with a molecular weight of 15,000 grams per mole and Shepard Blue #3 are described in FIG. 2. Similar results were achieved through accelerated QUV weathering tests of coatings comprising PMMA with a molecular weight of about 15,000 grams per mole and Titanium Dioxide.

EXAMPLE 2

Coating compositions prepared from PMMA with a moderate molecular weight of about 120,000 grams per mole and PVDF, were formulated using the procedures described in Example 1. The compositions of the coatings formulated by use of PMMA with a molecular weight of 120,000 grams per mole prepared for this Example are described in Table 1 under Experiment Numbers 3 and 7.

The coating compositions were applied to an aluminum substrate and baked in accordance with the procedure described in Example 1. The dry coating was tested for the criteria discussed in Example 1 and/or set forth in Table 2. The testing results are described in Table 2 under Experiment Numbers 3 and 7.

The coating compositions prepared with PMMA with a molecular weight of about 120,000 grams per mole were subjected to accelerated QUV weathering tests using the equipment and procedures described in Example 1. The coatings were exposed to the same conditions for UV light and condensation for the same time periods, testing intervals and total testing time described in Example 1. The weatherability testing results represented in percentage gloss retention for the coatings prepared with PMMA with a molecular weight of about 120,000 grams per mole and Shepard Blue #3 are described in FIG. 2. Similar results were achieved through QUV weathering tests of coatings comprising PMMA with a molecular weight of about 120,000 grams per mole and Titanium Dioxide.

EXAMPLE 3

Coating compositions prepared from PMMA with a very high molecular weight of 1,000,000 grams per mole and PVDF were formulated using the procedure described in Example 1. The composition of the coatings formulated by use of PMMA with a molecular weight of 1,000,000 grams per mole prepared for this Example are described in Table 1 under Experiment Numbers 4 and 8.

The coatings were applied to an aluminum substrate and baked in accordance with the procedure described in Example 1. The dry coating was tested for the criteria discussed in Example 1 and/or listed in Table 2. The testing results are described in Table 2 under Experiment Numbers 4 and 8.

The coatings prepared with PMMA with a molecular weight of 1,000,000 grams per mole were subjected to accelerated QUV weathering tests using the equipment and procedures described in Example 1. The coatings were exposed to the conditions for UV light and condensation for the time periods, testing intervals and total testing time described in Example 1. The weatherability testing results represented in percentage gloss retention for the coating prepared with PMMA with a molecular weight of 1,000,000 grams per mole and Shepard Blue #3 are described in FIG. 2. Similar results were achieved through QUV weathering tests of coatings comprising PMMA with a molecular weight of about 1,000,000 grams per mole and Titanium Dioxide.

EXAMPLE 4 (Comparative)

Coating compositions, prepared from Acryloid B-44 acrylic resin known as Paraloid B-44 currently available from Rohm & Hass and PVDF, were formulated for comparison purposes using the procedure described in Example 1. The composition of the coatings formulated with Acryloid B-44 acrylic prepared for this example are described in Table 1 under Experiment Numbers 1 and 4.

The coatings were applied to an aluminum substrate and baked in accordance with the procedure described in Example 1. The dry coating was tested for the criteria discussed in Example 1 and/or listed in Table 2. The testing results are described in Table 2 under Experiment Numbers 1 and 4.

The coatings prepared with Acryloid B-44 (Paraloid B-44) were subjected to accelerated QUV weathering tests using the equipment and procedures described in Example 1. The coatings were exposed to the conditions for UV light and condensation for the time periods, testing intervals and total testing time described in Example 1.

Figure 2:
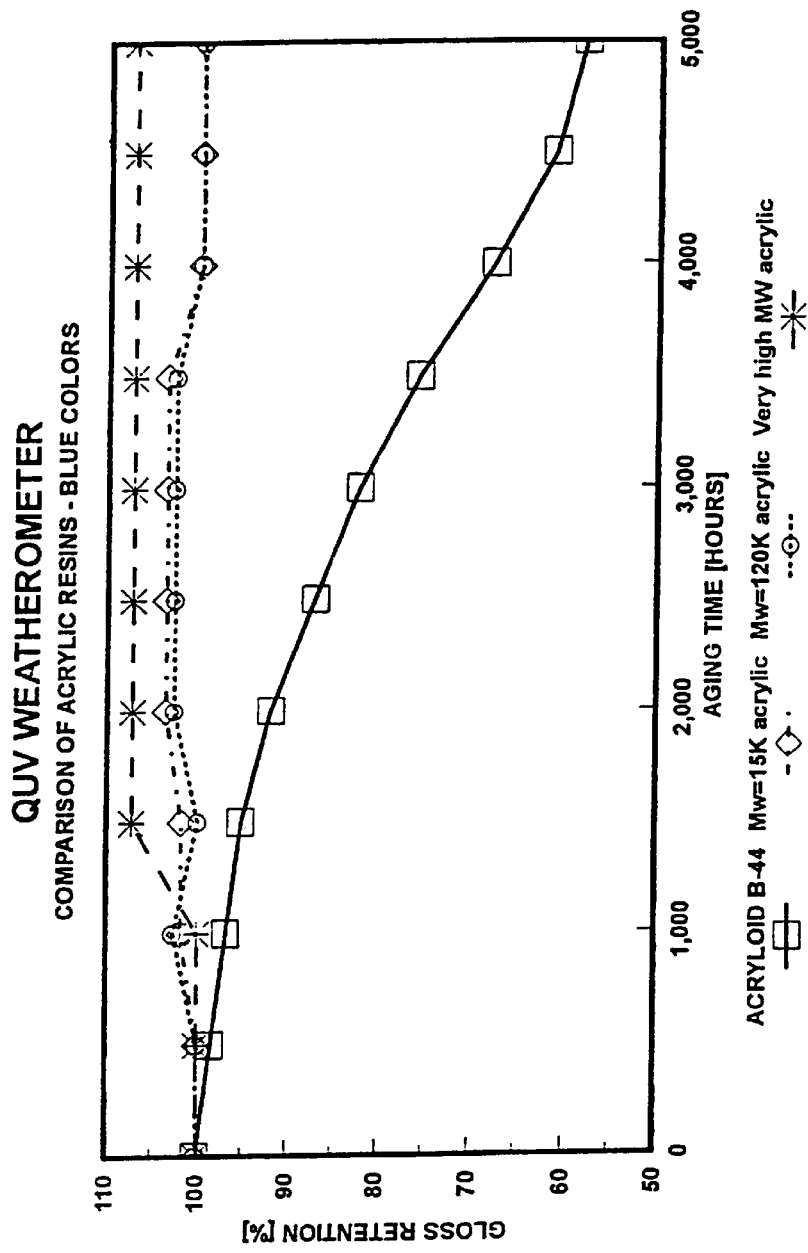
FIG. 2 is a plot of Percent Gloss Retention as a function of Aging Time for four different samples of PVDF/PMMA blends comprising PMMA of various molecular weights and Shepard Blue #3 pigment.

The weatherability testing results represented in percentage gloss retention for the coating prepared with Acryloid B-44 resin and Shepard Blue #3 are described in FIG. 2. Similar results were achieved through QUV weathering tests of coatings comprising Acryloid B-44 resin and Titanium Dioxide.

TABLE 1

Compositions of PVDF paints used in the study.

| Experiment Number | 1 | 2 | 3 | 4 | 5 | 6 | 7 | 8 |
|---|---|---|---|---|---|---|---|---|
| PVDF, phr | 100 | 100 | 100 | 100 | 100 | 100 | 100 | 100 |
| Film Forming Resins, phr | | | | | | | | |
| Acryloid B44 acrylic | 42.85 | | | | 42.85 | | | |
| 15,000 MW PMMA | | 42.85 | | | | 42.85 | | |
| 120,000 MW PMMA | | | 42.85 | | | | 42.85 | |
| 1,000,000 MW PMMA | | | | 42.85 | | | | 42.85 |
| Solvent | | | | | | | | |
| Isophorone | 180 | 180 | 180 | 180 | 105 | 105 | 105 | 120 |
| Methyl ethyl ketone | 99.96 | 99.96 | 99.96 | 171.40 | 99.96 | 99.96 | 99.96 | 171.40 |
| Pigment, phr | | | | | | | | |
| $TiO_2$ | 78.60 | 78.60 | 78.60 | 78.60 | | | | |
| Shepard Blue #3 | | | | | 42.85 | 42.85 | 42.85 | 42.85 |
| Solid content, Wt % | 44.17 | 44.17 | 44.17 | 38.66 | 36.57 | 36.57 | 36.57 | 29.94 |
| Pigment/Binder | 0.55 | 0.55 | 0.55 | 0.55 | 0.30 | 0.30 | 0.30 | 0.30 | phr — parts per hundred parts PVDF

TABLE 2

Molecular weight effect of PMMA on PVDF coating performance.

| Experimental Number | 1 | 2 | 3 | 4 | 5 | 6 | 7 | 8 |
|---|---|---|---|---|---|---|---|---|
| MEK Double Rubs | 110 | 30 | 200 | 20 | 145 | 42 | 166 | 30 |
| Pencil Hardness | H | H | H | H | H | H | H | H |
| Adhesion | 100% | 100% | 100% | 100% | 100% | 100% | 100% | 100% |
| OT Flexibility | NTO | NTO | NTO | NTO | NTO | NTO | NTO | NTO |
| Reverse Impact/#80 | >80 | >80 | >80 | >80 | >80 | >80 | >80 | >80 |
| Gloss-60 deg. | 64.00 | 62.80 | 56.50 | 34.00 | 62.80 | 55.80 | 39.40 | 14.80 |
| DFT/Mils | 0.85 | 0.85 | 0.85 | 0.85 | 0.85 | 0.85 | 0.85 | 0.85 |

NTO — No tape off.
DFT — Dry film thickness.

The examples demonstrate that PVDF based coatings comprising alkyl methacrylate polymers, such as PMMA, having a molecular weight of between about 25,000 grams per mole and 200,000 grams per mole, preferably between about 100,000 grams per mole and about 150,000 grams per mole, have unexpected and exemplary weather resistance as demonstrated by the combination of solvent resistance, hardness and initial gloss and gloss retention. There is discovered an unexpected range for molecular weight of alkyl methacrylate polymers in PVDF based coating compositions that results in exemplary properties that make such compositions uniquely tailored as a coating composition. Furthermore, it is discovered that the coating compositions of the invention comprising polymers of vinylidene fluoride which have from about 20% to about 70% crystallinity also allows for the exemplary and unexpected properties.

Solvent resistance is measured by MEK double rubs which provides a measure of the number of rubs over the coating until the first metal is observed, that is when the coating wears completely in at least one location on the coated substrate. As demonstrated through the Examples, solvent resistance is poorer and unacceptable for blends with both low (about 15,000 grams per mole) and high molecular weight (about 1,000,000 grams per mole) PMMA as compared to blends comprising moderate molecular weight (about 120,000 grams per mole) PMMA.

Gloss is an important characteristic of a coating composition. The material must have sufficient initial gloss and then must adequately retain the gloss during long term exposure. The PVDF/PMMA coating compositions prepared for the Examples demonstrate a decrease in gloss with increased molecular weight. There was a precipitous drop when PMMA had a molecular weight of about 1,000,000 grams per mole. The gloss of the coating comprising Acryloid B-44 resin is reduced gradually upon QUV exposure and ultimately the gloss retention levels off after long exposure. Equivalent coatings that substitute PMMA for Acryloid B-44 resin do not exhibit significant change in gloss reduction. Thus, the coatings of the present invention have about 100 percent gloss retention after about 5,000 hours of QUV exposure.

The percentage of gloss retention for the coatings studied to demonstrate aspects of the invention may be due to the differences in photo oxidative degradation of the Acryloid B-44 and PMMA by the QUV exposure conditions. Standard thermogravimetric analyses were applied to the samples which indicate about 70 percent by weight degradation of Acryloid B-44 in paint coatings comprising Acryloid B-44 after 5,000 hours of QUV exposure. The coatings comprising PMMA, however, exhibited only a small weight percentage of PMMA degradation after 5,000 hours of exposure and the weight percent degradation decreased as the molecular weight of the PMMA in the studied blends increased. Hence, although the inventors do not wish to be bound to any particular theory, it appears that a factor contributing to the decrease of gloss of the paint coatings upon weathering is the generation of free radicals by UV light through photoxidation of Acryloid B-44 and PMMA in the miscible blends.

While the invention has been described in terms of a preferred embodiment, the scope of the invention is set forth as the following claims.

What is claimed is:

1. A weather resistant coating composition comprising a homogenized miscible polymer blend having from about 50 weight percent to about 90 weight percent of a polymer having a crystallinity from about 20% to about 70% comprising polyvinylidene fluoride and from about 10 weight percent to about 50 weight percent of a polymer having a molecular weight of about 25,000 grams per mole to about 200,000 grams comprising alkyl methacrylate.

2. The weather resistant coating composition of claim 1 wherein said polymer comprising alkyl methacrylate has a molecular weight of about 100,000 grams per mole to 150,000 grams per mole.

3. The weather resistant coating composition of claim 1 wherein said polymer comprising alkyl methacrylate comprises at least about 65 weight percent methyl methacrylate and up to about 35 weight percent of a polymer which is ethyl methacrylate or butyl methacrylate.

4. The weather resistant coating composition of claim 1 wherein said crystalline polymer comprising polyvinylidene fluoride comprises at least about 80 weight percent vinylidene fluoride and up to about 20 weight percent hexafluoropropylene.

5. The weather resistant coating composition of claim 1 wherein said crystalline polymer comprising polyvinylidene fluoride has a molecular weight of up to about 600,000 grams per mole.

6. The weather resistant coating composition of claim 1 wherein said crystalline polymer comprising polyvinylidene fluoride has a melt viscosity of about 1 k poise to about 80 k poise at 232° C. and a shear rate of about 100 sec$^{-1}$.

7. The weather resistant coating composition of claim 1 further comprising solvent.

8. The weather resistant coating composition of claim 7 wherein said solvent is isophorone or methyl ethyl ketone.

9. The weather resistant coating composition of claim 1 further comprising pigment.

10. The weather resistant coating composition of claim 9 wherein said pigment is titanium dioxide or Shepard Blue #3.

11. The weather resistant coating composition of claim 1 further comprising binder.

12. A method for making a weather resistant coating composition comprising the steps of:

dissolving polymer comprising an alkyl methacrylate having a molecular weight of about 25,000 grams per mole to about 200,000 grams per mole in a solvent to form a solution;

blending said solution with a pigment to form a uniform dispersion and then homogenizing said uniform dispersion;

adding said uniform dispersion to an amount of highly crystalline polymer comprising polyvinylidene fluoride to formulate a blend; and homogenizing said blend in a high speed disperser and then in a glass bead shaker.

13. The method of claim 12 wherein said polymer comprising alkyl methacrylate comprises at least about 65 weight percent methyl methacrylate and up to about 35 weight percent of a polymer which is ethyl methacrylate or butyl methacrylate.

14. The method of claim 12 wherein said highly crystalline polymer comprising polyvinylidene fluoride comprises at least about 80 weight percent vinylidene fluoride and up to about 20 weight percent hexafluoropropylene.

15. The method of claim 12 wherein said pigment is titanium dioxide or Shepard Blue #3.

16. A method of coating a substrate comprising the steps of coating said substrate by applying a weather resistant coating composition comprising from about 50 weight percent to about 90 weight percent of a polymer having a crystallinity from about 20% to about 70% comprising polyvinylidene fluoride and from about 10 weight percent to about 50 weight percent of a polymer having a molecular weight of about 25,000 grams per mole to about 200,000 grams per mole comprising alkyl methacrylate to said substrate, heating said substrate to a temperature of up to about 465° F. and allowing said substrate to cool to ambient temperature.

17. The method of claim 16 wherein said substrate is heated for about one minute.

18. An article of manufacture comprising the weather resistant coating composition of claim 1.

* * * * *

UNITED STATES PATENT AND TRADEMARK OFFICE
CERTIFICATE OF CORRECTION

PATENT NO. : 6,362,271 B1
DATED : March 26, 2002
INVENTOR(S) : Lin et al.

It is certified that error appears in the above-identified patent and that said Letters Patent is hereby corrected as shown below:

Title page,
Item [63], replace the Related U.S. Application Data, with: -- Continuation-in-part of application No. 09/035,256, filed on Mar. 5, 1998, now abandoned. --

Column 1,
Lines 8-10, in the section titled "CROSS -REFERENCE TO RELATED APPLICATIONS" replace "This is a Continuation-in-Part of application Ser. No. 09/036,256 filed on Mar. 5, 1998 now U.S. Patent No. 5,981,854." with:
-- This is a Continuation-in-Part of application Ser. No. 09/035,256 filed on Mar. 5, 1998, now abandoned. --

Signed and Sealed this

Tenth Day of September, 2002

Attest:

Attesting Officer

JAMES E. ROGAN
*Director of the United States Patent and Trademark Office*